United States Patent
Blaney (10) Patent No.: US 11,697,624 B2
(45) Date of Patent: Jul. 11, 2023

(54) NUTRIENT EXTRACTION AND RECOVERY DEVICE FOR ISOLATION AND SEPARATION OF TARGET PRODUCTS FROM ANIMAL PRODUCED WASTE STREAMS

(71) Applicant: UNIVERSITY OF MARYLAND, BALTIMORE COUNTY, Baltimore, MD (US)

(72) Inventor: Lee Blaney, Baltimore, MD (US)

(73) Assignee: University of Maryland, Baltimore County, Baltimore, MD (US)

(*) Notice: Subject to any disclaimer, the term of this patent is extended or adjusted under 35 U.S.C. 154(b) by 913 days.

(21) Appl. No.: 16/419,334

(22) Filed: May 22, 2019

(65) Prior Publication Data
US 2019/0270679 A1 Sep. 5, 2019

Related U.S. Application Data

(62) Division of application No. 15/381,258, filed on Dec. 16, 2016, now Pat. No. 10,329,206.
(Continued)

(51) Int. Cl.
*C05B 7/00* (2006.01)
*B01D 15/36* (2006.01)
(Continued)

(52) U.S. Cl.
CPC .............. *C05B 7/00* (2013.01); *B01D 15/362* (2013.01); *B01D 15/363* (2013.01);
(Continued)

(58) Field of Classification Search
CPC .. C05B 7/00; C05B 17/00; C05B 9/00; B01D 15/362; B01D 15/363; B01D 17/0217;
(Continued)

(56) References Cited

U.S. PATENT DOCUMENTS 2,694,680 A * 11/1954 Katz ...................... B01D 61/46
204/530
2,796,395 A * 6/1957 Roberts .................. B01D 61/44
204/263
(Continued)

FOREIGN PATENT DOCUMENTS

WO WO2011130809 * 10/2011
WO WO-2013125954 A1 ‡ 8/2013 ............. B01D 61/42

OTHER PUBLICATIONS

Sarkar, S. et al. (2010) The Donnan Membrane Principle: Opportunities for Sustainable Engineered Processes and Materials. Environmental Science&Technology44(4), 1161-1166.‡
(Continued)

Primary Examiner — Joseph W Drodge
(74) Attorney, Agent, or Firm — Tristan A. Fuierer; Casimir Jones, SC (57) ABSTRACT

The present invention provides for nutrient extraction and recovery devices that use the Donnan Membrane Principle (DMP) to cause spontaneous separation of dissolved ions along electrochemical potential gradients, wherein anions and cations such as $H_2PO_4^-$, $HPO_4^{2-}$, $PO_4^{3-}$, $Mg^{2+}$, $Ca^{2+}$, $NH_4^+$, and $K^+$ are moved from manure containing waste streams through cation and anion exchange membranes into a recovery stream thereby precipitating target compounds including but not limited to struvite, potassium struvite and hydroxyapatite.

11 Claims, 11 Drawing Sheets

Related U.S. Application Data (60) Provisional application No. 62/267,995, filed on Dec. 16, 2015.

(51) Int. Cl.
  *B01D 17/02* (2006.01)
  *C05B 17/00* (2006.01)
  *C01B 25/45* (2006.01)
  *C01B 25/32* (2006.01)
  *B01D 61/42* (2006.01)
  *A01C 3/00* (2006.01)
  *B01D 21/24* (2006.01)

(52) U.S. Cl.
  CPC ......... *B01D 17/0217* (2013.01); *B01D 21/24* (2013.01); *B01D 61/42* (2013.01); *C01B 25/327* (2013.01); *C01B 25/451* (2013.01); *C05B 17/00* (2013.01); *A01C 3/00* (2013.01)

(58) Field of Classification Search
  CPC ...... B01D 61/42; B01D 61/46; B01D 15/361; B01D 21/26; B01D 21/262; B01D 25/12; B01D 29/0018; B01D 33/03; B01D 33/056; B01D 36/00; B01D 36/02; B01D 36/04; B01D 36/045; B01D 61/44; B01D 61/52; B01D 2311/06; B01D 2311/2623; B01D 2311/2649; B01D 2311/2676; B01D 2311/2684; B01D 21/24; B01D 21/2405; B01D 21/2444; B01D 21/2488; C01B 25/327; C01B 25/451; C01B 25/28; C01B 25/32; C01B 25/34; C01B 25/45; A01C 3/00; C02F 11/006; C02F 11/12; C02F 11/121; C02F 11/123; C02F 11/125; C02F 11/127

See application file for complete search history.

(56) References Cited

U.S. PATENT DOCUMENTS

| | | | | |
|---|---|---|---|---|
| 2,849,278 A * | 8/1958 | Feldt | ................ | C22B 60/0234 423/253 |
| 2,947,688 A * | 8/1960 | Murphy | ................ | B01J 47/12 210/321.75 |
| 3,454,490 A * | 7/1969 | Wallace | ................ | B01D 61/246 423/24 |
| 3,547,657 A * | 12/1970 | Hiromitsu | ................ | A23L 3/325 99/485 |
| 5,993,503 A * | 11/1999 | Kruidhof | ................ | C05F 3/00 71/21 |
| 7,431,834 B2 * | 10/2008 | Shimamura | ................ | C02F 11/143 210/194 |
| 8,236,158 B2 * | 8/2012 | Sparrow | ................ | B01D 61/54 204/522 |
| 10,329,206 B2 * | 6/2019 | Blaney | ................ | C01B 25/327 |
| 2004/0198849 A1 * | 10/2004 | Aminabhavi | ................ | B01D 69/10 521/27 |
| 2005/0023220 A1 * | 2/2005 | Barak | ................ | B82Y 30/00 423/322 |
| 2006/0231404 A1 * | 10/2006 | Riviello | ................ | B01D 61/48 204/524 |
| 2007/0241041 A1 * | 10/2007 | Shimamura | ................ | C02F 11/127 210/197 |
| 2009/0277840 A1 * | 11/2009 | Guertin | ................ | C02F 9/00 210/665 |
| 2011/0068002 A1 * | 3/2011 | Lin | ................ | C08J 5/2225 521/27 |
| 2011/0077144 A1 * | 3/2011 | Jessen | ................ | B01J 49/53 502/25 |
| 2011/0113840 A1 * | 5/2011 | Alitalo | ................ | C02F 3/121 435/283.1 |
| 2014/0352380 A1 * | 12/2014 | Thelin | ................ | C01B 25/45 71/36 |
| 2015/0274562 A1 * | 10/2015 | Batstone | ................ | C02F 1/4695 204/632 |
| 2017/0174577 A1 * | 6/2017 | Blaney | ................ | C01B 25/327 |

OTHER PUBLICATIONS

Prakash, P. et al. (2005) Modeling Al3+/H+ ion transport in Donnan membrane processfor coagulant recovery.AlChEJournal51(1),333-344.‡

Sengupta, S. et al. (2015) Nitrogen and Phosphorus Recovery from Wastewater.CurrentPollution Reports,1:155-166.‡

Sendrowski, A. et al. (2013) Phosphate removal from urine using hybrid anion exchange resin.Desalination322, 104-112.‡

Prakash, P. et al. (2003) Selective Coagulant Recovery from Water Treatment Plant Residuals Using Dorman Membrane Process. Environmental Science&Technology37(19), 4468-4474.‡

Prakash, P. et al. (2004) Application of homogeneous and heterogeneous cation-exchange membranes in coagulant recovery from water treatment plant residuals using Dorman membrane process. Journal ofMembraneScience237(12), 131-144.‡

O'Neal, J.A. et al. (2013) Phosphate recovery using hybrid anion exchange:Applications to source-separated urine and combined wastewater streams.WaterResearch47(14), 5003-5017.‡

Karunanithi, R. et al. (2015) Phosphorus recovery and reuse from waste streams.Adv. Agron131.‡

\* cited by examiner
‡ imported from a related application

NUTRIENT EXTRACTION AND RECOVERY DEVICE FOR ISOLATION AND SEPARATION OF TARGET PRODUCTS FROM ANIMAL PRODUCED WASTE STREAMS

CROSS-REFERENCE TO RELATED APPLICATION

This application is filed under the provisions of 35 U.S.C. § 121 and is a divisional application claiming priority to U.S. patent application Ser. No. 15/381,258 filed on Dec. 16, 2016, now U.S. Pat. No. 10,329,206, which claims priority to U.S. Provisional Patent Application No. 62/267,995 filed on Dec. 16, 2015, the contents of which are all incorporated by reference herein for all purposes.

BACKGROUND OF THE INVENTION

Field of Invention

The present invention relates generally to the problems associated with waste in animal confinements, and more specifically, to separation methods and systems for converting high concentrations of animal wastes into nutrients and other useful products.

Related Art in Technical Field

The cleanup and handling of cattle, swine and poultry manure has become a critical issue in the management and disposal of animal waste. Animals have been raised for centuries for food and previously such animals grazed in fields or pens. Current methods of raising livestock include housing in high concentration within a confined space. Numerous drawbacks of such confinement include high concentrations of waste that must be removed from the confined space.

The manure produced must be removed regularly to ensure adequate sanitation and to prevent disease. One manure removal method is to flood the housing area with water in order to wash away the manure. The resulting effluent, that being a liquid/solid manure slurry, is typically directed through pipes or channels to a manmade slurry pond or lagoon, where the solids and particulates settle to the bottom and the animal waste decomposes. After some decomposing, the waste can be applied as a fertilizer. Additionally the liquid/solid manure can be directed to a biodigester to capture some of the gaseous components of the manure and use the gases for energy, thereby reducing air quality issues of manure accumulation and storage. However, the remaining liquids and solid from biodigester processing must still be addressed to minimize loss of nutrient or contamination of lagoons, fields, drinking water, wells, or fresh water streams or lakes.

Notably, prolonged mixing of solid and liquid wastes in a waste manure lagoon can result in the transfer of a significant amount of nutrients from the solid material to the surrounding liquid, so that the solids become depleted of nutrients that may be desirable in a manure fertilizer. However, the liquids become loaded with nitrogen, phosphorus and salts to such an extent that they must be either limited in their irrigation use, or mixed with fresh water to lower the proportion of these substances. In other words, the useful qualities of both the solid and liquid portions of the slurry mixture are degraded over time in a slurry pond or lagoon.

Further, the environmental impact can be substantial when applying the waste to fields. Such environmental issues may include groundwater leaching from the lagoon causing contamination of groundwater and/or streams and sand soil contamination. Additionally, the high volume of solid waste manure, coupled with its use as fertilizer in local fields, results in increased levels of phosphorus, nitrogen, and potassium in the soils. This may allow such chemicals to also leach into drainage waters and run-off streams. The high volume of liquid waste manure, coupled with its use as fertilizer in local fields, results in increased levels of nitrogen rich ammonium and ammonia in the soils. This may allow such chemicals to also leach into drainage waters and run-off streams.

There has been increasing publicity and stricter environment requirements and enforcement because of the continuing concern over maintaining water quality in watershed areas due to the release of manure as normal operational discharges from dairy cattle, beef cattle, swine, poultry and other concentrated animal feeding operations. Current technologies for separating solids and nutrient components of such animal waste have limitations, are costly to operate, and result in the use of large quantities of fuel and labor in order to provide solid and water-based effluents that can either be recycled or are environmentally acceptable to spread on farmlands.

Thus, what is needed is an improved process and separation system for treating animal waste that is low in capital equipment cost, low in waste transportation cost, prevents pollution of water resources, simple to operate, and that provides solid and liquid effluents containing beneficial and useful products to generate a sustainable supply of nutrients critical for food production.

SUMMARY OF THE INVENTION

The present invention relates to separation systems and methods to process a manure source containing urine and fecal matter from cows, swine, sheep, goats, poultry, horses, rabbits and other animals to provide target products including, but not limited to, ammonia, potassium, phosphorus, magnesium, struvite, potassium struvite, hydroxyapatite, nonpotable water and/or a filtrate with reduction of residuals for spraying on fields.

In one aspect, the present invention provides a process for treating manure in order to isolate a target precipitate, the process comprising:

a) providing a manure medium;

b) introducing the manure medium into a separating system comprising:

c) a waste compartment and a recovery compartment positioned within the waste compartment, wherein the recovery compartment comprises at least one cation exchange membrane and at least one anion exchange membrane, wherein the at least one cation exchange membrane and the at least one anion exchange membrane are positioned on opposite or adjacent sides on the recovery compartment, and wherein the recovery compartment comprises an inlet and outlet for moving a recovery stream therethrough and wherein the recovery stream comprising an ionic solution comprising salts of $Na^+$, $K^+$, and/or $NH_4^+$ with $Cl^-$, $HO^-$, $HCO_3^-$, and/or $HCOO^-$; and d) moving the manure medium into the waste compartment, wherein the manure medium contacts both the at least one cation exchange membrane and the at least one anion exchange membrane; wherein anions in the waste medium will pass through the anion exchange membrane into the recovery stream and cations in the waste medium will pass through the cation exchange membrane into the recovery stream, wherein ions in the recovery stream form a precipitate selected from the group consisting of struvite, potassium struvite and/or hydroxyapatite. Preferrably, the inlet and outlet of the recovery compartment are positioned so that no manure medium enters the recovery stream, In another aspect, the present invention provides a process for treating manure in order to isolate at least one target precipitate, the process comprising:

a) providing a manure medium;

b) introducing the manure medium into a recovery system comprising:

a first and second waste compartment and a recovery compartment positioned between the first and second waste compartments, wherein the first and second waste compartments comprise an inlet and outlet for moving a first and second waste stream therethrough, respectively, wherein the recovery compartment comprises an inlet and outlet for moving a recovery stream therethrough, and wherein the first waste compartment is separated from the recovery compartment by at least one cation exchange membrane and the second waste compartment is separated from the recovery compartment by at least one anion exchange membrane;

c) separating the manure medium into the first and second waste streams for introducing into the inlet of the first and second waste compartments, respectively;

d) introducing an ionic solution comprising salts of $Na^+$, $K^+$, and/or $NH_4^+$ with $Cl^-$, $HO^-$, $HCO_3^-$, and/or $HCOO^-$ into the recovery stream, wherein anions in the first waste stream will pass through the at least one anion exchange membrane into the recovery stream and cations in the second waste stream will pass through the at least one cation exchange membrane into the recovery stream, wherein a substantially equal amount of cations and anions from the recovery stream will move into the respective first and second waste stream, and wherein ions in the recovery stream form a precipitate comprising struvite, potassium struvite and/or hydroxyapatite thereby reestablishing an electrochemical potential gradient across the at least one cation and at least one anion exchange membranes to provide for additional movement of ions through the anion and cation exchange membranes thereby forming additional precipitate.

Preferably the waste stream comprises at least orthophosphate (also written as P(V) (phosphorus in +5 oxidation state) or the $H_3PO_4$, $H_2PO_4^-$, $HPO_4^{2-}$, and $PO_4^{3-}$ system), $Mg^{2+}$, $Ca^{2+}$, $NH_4^+$ and $K^+$ ions that move into the recovery stream thereby precipitating as the compounds struvite, potassium struvite or hydroxyapatite. As the struvite, potassium struvite or hydroxyapatite minerals are formed they can be removed from the recovery stream, by known separation means. The waste streams and the recovery stream can be recirculating to provide additional access to the cation and anion exchange membranes.

Notably, struvite, potassium struvite and hydroxyapatite are all soluble in an aqueous solution when the pH is less than about 5.0. The dominant phosphate species is $HPO_4^{2-}$ at pH of about 7.5 and as the pH increases more $HPO_4^{2-}$ is available to form more nutrient-rich minerals. The ideal pH for the formation of nutrient-rich minerals is from about 7.0 to 11.0. Thus, the recovery stream can operate in the near-neutral or alkaline pH range to ensure maximal formation of nutrient-rich minerals.

At stated above, the manure medium contains at least phosphorus and nitrogenous compounds and in some situations the addition of magnesium chloride ($MgCl_2$) to the recovery compartment or the waste compartment may be necessary to force the precipitation of struvite ($MgNH_4PO_4 \cdot 6H_2O$). Further, adjusting the pH of the solution in the recovery chamber to a pH of about 9.0-10 with sodium hydroxide (NaOH) can increase formation of potassium struvite. Additionally, the present invention has the ability to provide for the formation of hydroxyapatite ($Ca_{10}(PO_4)_6(OH)_2$). To proceed with the formation of hydroxyapatite, a calcium source may be added into the waste streams and phosphorus is recovered in the form of calcium phosphate.

The precipitated nutrient-rich minerals can be utilized as a slow release fertilizer as either as a specialty fertilizer in plant nurseries or blended into main agricultural fertilizers. Notably, even when applied at relatively high application rates, struvite can act as a slow release fertilizer without damaging plant roots and leaching potential is low. The process can be controlled to generate predominantly struvite, potassium struvite, or hydroxyapatite. By mixing these products, custom fertilizers with specific nitrogen to phosphorus to potassium (NPK) ratios can be generated.

In another aspect, the present invention provides for a system for precipitating struvite, potassium struvite and or hydroxyapatite, the system comprising:

a waste compartment and a recovery compartment positioned within the waste compartment, wherein the recovery compartment comprises at least one cation exchange membrane and at least one anion exchange membrane, wherein the at least one cation exchange membrane and the at least one anion exchange membrane are positioned on opposite or adjacent sides on the recovery compartment, and wherein the recovery compartment comprises an inlet and outlet for moving a recovery stream therethrough and wherein the recovery stream comprising an ionic solution comprising salts of $Na^+$, $K^+$, and/or $NH_4^+$ with $Cl^-$, $HO^-$, $HCO_3^-$, and/or $HCOO^-$.

In yet another aspect, the present invention provides for a system for isolating and precipitating struvite, the system comprising:

a first and second waste compartment and a recovery compartment positioned between the first and second waste compartments, wherein the first and second waste compartments comprise an inlet and outlet for moving a first and second waste stream therethrough, respectively, wherein the recovery compartment comprises an inlet and outlet for moving a recovery stream therethrough, and wherein the first waste compartment is separated from the recovery compartment by at least one cation exchange membrane and the second waste compartment is separated from the recovery compartment by at least one anion exchange membrane.

Livestock manure besides containing a mixture of feces and urine may also include wasted feed, bedding and water (including: spilled water, flush water, wash water, and precipitation). Manure characteristics are generally affected by diet, species and the growth stage of the animals, and the manure collection method used, including the amount of water added to dilute the waste. Typically, animal waste manure is about 80% to about 95% liquid by weight due to urine, sloppy drinking, animal washing and flush water. As such, the manure medium may be pretreated with mechanical system to remove any unwanted material, larger solids and excess liquids from the manure medium before introduction into the system of the present invention, wherein the pretreating includes systems such as screw press, centrifuge, vibrating screen, mesh screening, belt filter, hydrocylcone and other systems that may further reduce particle size, and/or remove unwanted large material to ensure easy flow through the first and second waste streams.

Further, the manure may be pretreated in an anaerobic digester, which includes holding manure in an air-tight tank that is heated to about 100 degrees. Bacteria in the manure thrive in these conditions and they consume solids in the manure while releasing methane gas. Naturally occurring bacteria will degrade the volatile solids, releasing a combination of carbon dioxide ($CO_2$) and methane ($CH_4$) that may be burned/combusted for energy production. Digestion does not reduce the nutrients in the manure, although it may alter the form of the nitrogen (more ammonia) and phosphorus (more orthophosphate).

Notably, ferric chloride ($FeCl_3$), ferric sulfate ($FeSO_4$), calcium hydroxide (lime), aluminum sulfate (alum) and aluminum chloride ($AlCl_3$) can also be used for phosphorus binding and the formation of common phosphorus salts. The addition of these binding agents forms a solid salt that can be collected and removed by filtration.

Still further, the manure medium may be treated with chemicals to help separate solids from liquids. Flocculation is a process that converts coagulated particles into large, rapidly settling masses, also called flocs. The most common chemicals used to coagulate and flocculate solids in animal manure and wastewater are organic polymers such as polyacrylamide (PAM), and metal salts such as ferric chloride ($FeCl_3$), alum ($Al_2(SO_4)_3$) and lime ($Ca(OH)_2$). Such flocs can be further removed by screening methods or centrifuging.

The recovery stream, with the removal of salt content, may be utilized as the liquid fertilizer and the treated waste stream may be dehydrated to minimize water content and provides for a solid fertilizer.

In yet another aspect, the present invention provides for a method to isolate struvite, potassium struvite and hydroxyapatite from a manure medium, the method comprising:
  a) providing a manure medium comprising P(V), $Mg^{2+}$, $Ca^{2+}$, $NH_4^+$, and $K^+$ ions;
  b) introducing the manure medium into a recovery system comprising:
    a first and second waste compartment and a recovery compartment positioned between the first and second waste compartments, wherein the first and second waste compartments comprise an inlet and outlet for moving a first and second waste stream therethrough, respectively, wherein the recovery compartment comprises an inlet and outlet for moving a recovery stream therethrough and wherein the first waste compartment is separated from the recovery compartment by at least one cation exchange membrane and the second waste compartment is separated from the recovery compartment by at least one anion exchange membrane;
  c) separating the manure medium into the first and second waste streams for introducing into the inlet of the first and second waste compartments, respectively;
  d) introducing a ionic solution comprising salts of $Na^+$ or, $K^+$ with $Cl^-$, $HO^-$, $HCO_3^-$, and/or $HCOO^-$ into the recovery stream, wherein the $HPO_4^{2-}$ anions in the first waste stream will pass through the at least one anion exchange membrane into the recovery stream and $Mg^{2+}$ and $NH_4^+$ cations in the second waste stream will pass through the at least one cation exchange membrane into the recovery stream, wherein a substantially equal amount of $Na^+$ cations and $Cl^-$ anions from the recovery stream will move into the respective first and second waste stream, and wherein ions in the recovery stream form a struvite precipitate thereby reestablishing an electrochemical potential gradient across the cation and anion exchange membranes to provide for additional movement of ions through the anion and cation exchange membranes.

In a still further aspect, the present invention provides for a method to isolate struvite, potassium struvite and hydroxyapatite from a manure medium, the method comprising:
  a) providing a manure medium comprising P(V), $Mg^{2+}$, $Ca^{2+}$, $NH_4^+$, and $K^+$ ions;
  b) introducing the manure medium into a recovery system comprising:
    a waste compartment and a recovery compartment positioned within the waste compartment, wherein the recovery compartment comprises at least one cation exchange membrane and at least one anion exchange membrane, wherein the at least one cation exchange membrane and the at least one anion exchange membrane are positioned on opposite or adjacent sides on the recovery compartment, and wherein the recovery compartment comprises an inlet and outlet for moving a recovery stream therethrough;
  c) moving the manure medium into the waste compartment, wherein the manure medium contacts both the at least one cation exchange membrane and the at least one anion exchange membrane; and
  d) introducing a ionic solution comprising salts of $Na^+$ or, $K^+$ with $Cl^-$, $HO^-$, $HCO_3^-$, and/or $HCOO^-$ into the recovery stream, wherein the $HPO_4^{2-}$ anions in the manure medium will pass through the at least one anion exchange membrane into the recovery stream and $Mg^{2+}$ and $NH_4^+$ cations in the manure medium will pass through the at least one cation exchange membrane into the recovery stream, wherein a substantially equal amount of $Na^+$ cations and $Cl^-$ anions from the recovery stream will move into manure medium, and wherein ions in the recovery stream form a struvite, potassium struvite or hydroxyapatite precipitate thereby reestablishing an electrochemical potential gradient across the at least one cation and at least one anion exchange membrane to provide for additional movement of ions through the at least one anion and the at least one cation exchange membranes.

Other aspects and advantages of the invention will be more fully apparent from the ensuing disclosure and appended claims.

BRIEF DESCRIPTION OF THE FIGURES

FIG. 1 shows Simultaneous recovery of nutrient-rich solutions that can be used to precipitate struvite-based solids using a three-chamber design that incorporates both anion and cation exchange membranes. Note that the two waste chambers are one container, and the second compartment is essentially an insert containing an anion exchange membrane on one side, and a cation exchange membrane on the other. This setup ensures that changes to the chemistry of the first chamber are reflected in the third chamber. (a) initial conditions with waste compartments and a NaCl-based draw solution; (b) transport of anions and cations across the anion and cation exchange membranes, respectively; (c) equilibrium situation with selective recovery of $PO_4^{3-}$ (as $HPO_4^{2-}$ here), $Mg^{2+}$, and $NH_4^+$, which precipitate to form struvite.

DETAILED DESCRIPTION OF THE INVENTION

Nutrient extraction and recovery devices (NERDs) exploit the Donnan Membrane Principle (DMP) [1-4] to cause spontaneous separation of dissolved ions along electrochemical potential gradients. This innovative technology challenges conventional wisdom by taking a completely different approach to nutrient recovery. Given the high energy and chemical costs associated with traditional approaches, the present invention provides for a novel and effective extraction system.

The invention takes advantage of the DMP for removal and recovery of P(V) (as $HPO_4^{2-}$ here), $Mg^{2+}$, $Ca^{2+}$, $NH_4^+$, and $K^+$ ions from waste sludge such as manure. The Donnan membrane principle is based on the Donnan co-ion exclusion phenomenon, according to which negatively charged cation exchange membranes will reject anions, while positively charged anion exchange membranes will reject cations. Unlike other membrane processes, the Donnan membrane principle does not require a pressure gradient or an electric current supply, and operates by virtue of the electrochemical potential difference between electrolytes on two sides of an ion exchange membrane.

The term "manure" refers to any medium that includes animal waste and may also include but is not limited to water, feed, urine, fecal matter, straw, hay, bedding material, peat moss, and composts.

The system and individual compartments may be fabricated from any material that does not interact with any ions in the waste or recovery streams, including but not limited to polymeric, metallic or ceramic material.

In some embodiments, the cation exchange membranes, as disclosed herein, are conventional and are available from, for example, Asahi Kasei of Tokyo, Japan; or from Membranes International of Glen Rock, N.J., or DuPont, in the USA or SELEMION® by AGC Engineering Co., Ltd. Examples of cation exchange membranes include, but are not limited to, N2030WX (Dupont), F8020/F8080 (Flemion), FKE (Fuma Tech), CMI-7000 (Membranes International, Nafion 117 (Dupont) and F6801 (Aciplex). Cation exchange membranes that are desirable in the methods and systems of the invention have minimal resistance loss, greater than 90% selectivity, and high stability in concentrated caustic. Examples of cationic exchange membranes include, but not limited to, cationic membrane consisting of a polymer containing anionic groups, for example sulfonic and/or carboxylic groups. However, it may be appreciated that in some embodiments, depending on the need to restrict or allow migration of a specific cation or an anion species between the electrolytes, a cation exchange membrane that is more restrictive and thus allows migration of one species of cations while restricting the migration of another species of cations may be used.

Anion exchange membranes allow passage of salt ion such as chloride ion to the waste stream. Preferably the anion exchange membrane is also substantially resistant to the organic compounds such that the anion exchange membranes does not interact with the organics. For example only, polymers containing fixed tertiary or quaternary ammonium groups may be used as anion exchange membranes. Similarly, depending on the need to restrict or allow migration of a specific anion species, an anion exchange membrane that is more restrictive and thus allows migration of one species of anions while restricting the migration of another species of anions may be used. Examples of anion exchange membranes include, but are not limited to, FAA-3 (Fuma Tech), AMI-7001 (Membranes International) and AMX (Astom).

In some embodiments, the membranes used in the methods and systems provided herein are ion exchange membranes reinforced with a material for reinforcement and are of a certain thickness. For example, in some embodiments, the thickness of the membrane is between 20-130 um; or between 20-110 um; or between 20-110 um; or between 20-80 um; or between 20-75 um; or between 20-60 um; or between 20-50 um; or between 20-40 um; or between 20-35 um. In some embodiments, the membrane may be reinforced with materials such as, but not limited to, polymers, such as, polyethylene (PET), polypropylene (PP), and polyether ether ketone (PK), and glass fiber (GF).

The present invention works by exploiting DMP, which drives electrochemical potential equilibrium between two solutions separated by an ion exchange membrane, to recover nutrients. In particular, a recovery or draw solution containing less preferred species (e.g., Cl⁻) facilitates exponential recovery of more preferred species, such as $PO_4^{3-}$ and valuable cationic species (e.g., $NH_4^+$, $Mg^{2+}$, $Ca^{2+}$) can also be recovered. In tandem, the selectively separated nutrients facilitate recovery of value-added products, such as struvite, potassium struvite and hydroxyapatite.

Phosphorus and other nutrients can be selectively extracted from animal manure and concentrated in high-purity solutions. The chemical conditions in the recovery solution cause precipitation of valuable fertilizers. The present system does not require chemical addition or electricity; furthermore, this technology can be directly incorporated into manure pits and lagoons.

Current technologies rely on effective separation of nutrients before a forced chemical precipitation. For instance, previous researchers have used hybrid ion exchange resins and modified clay sorbents to effectively isolate phosphate ($PO_4^{3-}$) and/or ammonium ($NH_4^+$); following separation, nutrients are eluted from the sorbent media, mixed with $MgCl_2$, and recovered as struvite [5-8]. The present invention does not require energy intensive processes or external chemical addition.

Figure 1:
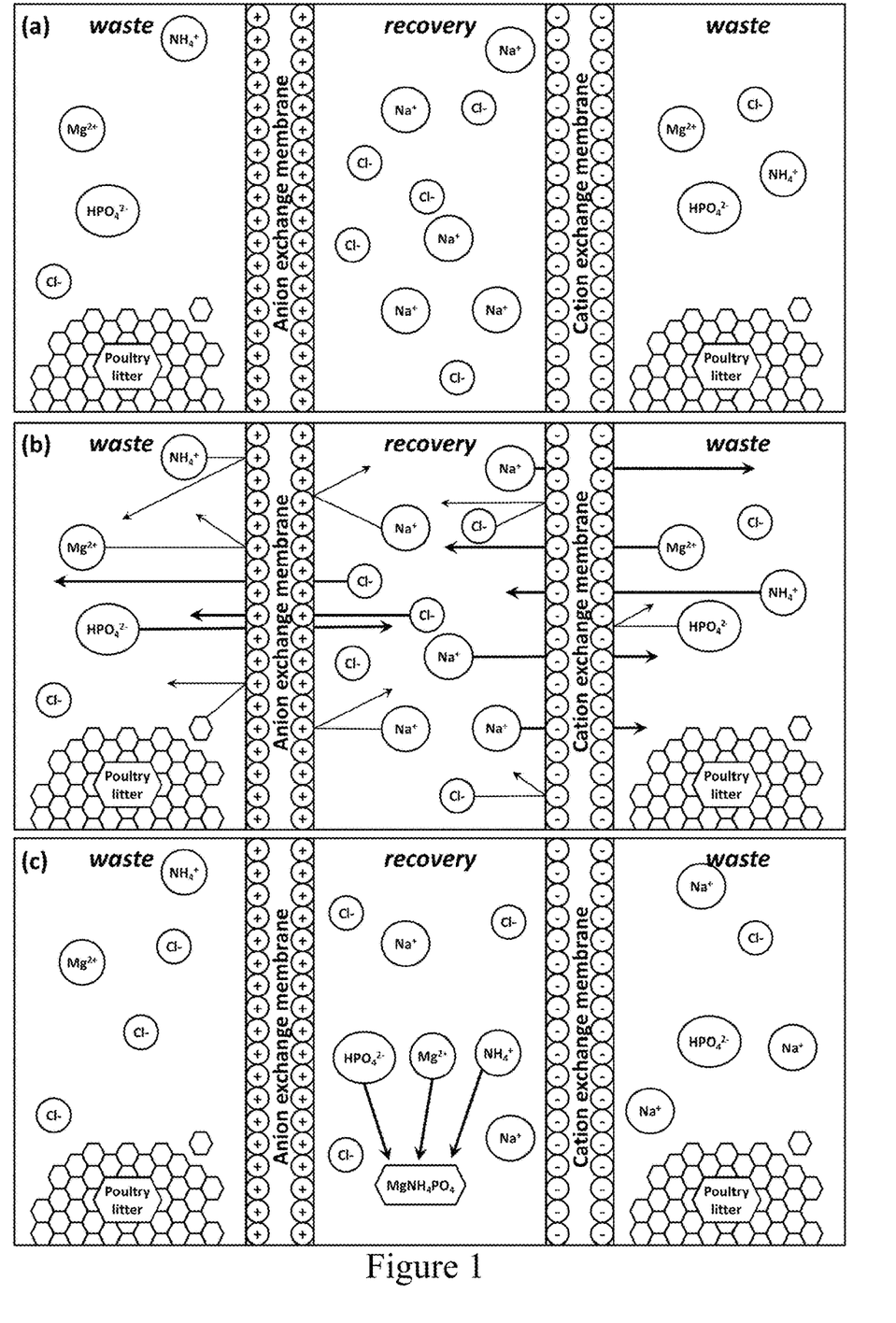

The process works by exploiting electrochemical potential equilibrium between two solutions separated by an ion exchange membrane. For simplicity, the two chambers will be labeled as waste (that containing manure from animal, such as poultry) and recovery (the draw solution) as shown in FIG. 1. To highlight the fundamentals of the proposed process, consider FIG. 2a, which illustrates P(V) recovery. The waste chamber contains wastewater, waste activated sludge, or agricultural waste and the recovery chamber contains a draw solution composed of high-strength sodium chloride. While the process looks similar to an electrodialysis cell, no electricity is used here. Instead, the differences in electrochemical potential between the waste and draw solutions drives the system to thermodynamic equilibrium by exchanging ions.

At equilibrium, $$\bar{\mu}_{F(V)}^{waste} = \bar{\mu}_{F(V)}^{recovery} \tag{Eq. 1}$$

where, $\bar{\mu}$ is the electrochemical potential, waste designates the chamber containing a poultry litter slurry, and recovery designates the chamber in which P(V) (i.e., the $H_3PO_4$, $H_2PO_4^-$, $HPO_4^{2-}$, and $PO_4^{3-}$ system) is recovered. Eq. 1 can be expanded to Eq. 2.

$$\mu_{F(V)}^o + RT \ln a_F^{waste} + zF\phi^{waste} = \mu_{F(V)}^o + RT \ln a_{F(V)}^{recovery} + zF\phi^{recovery} \tag{Eq. 2}$$

In Eq. 2, $\mu^o$ is the electrochemical potential at standard conditions, R is the gas constant, T is temperature, a is activity, z is the charge of the diffusing ion, F is the Faraday constant, and $\phi$ is the electrical potential. Rearranging Eq. 2 yields Eq. 3.

$$\frac{F(\phi^{waste} - \phi^{recovery})}{RT} = \ln\left(\frac{a_{P(V)}^{recovery}}{a_{P(V)}^{waste}}\right)^{\frac{1}{zP(V)}} = \ln\left(\frac{a_{draw}^{recovery}}{a_{draw}^{waste}}\right)^{\frac{1}{zdraw}} \tag{Eq. 3}$$

The second part of Eq. 3 is solved for a generic species, labeled draw here to refer to a draw ion present in the recovery solution. If the activity corrections for P(V) and the draw ion are similar on either side of the ion exchange membrane, Eq. 3 can be collapsed to Eq. 4, where C is molar concentration.

$$\left(\frac{C_{P(V)}^{recovery}}{C_{P(V)}^{waste}}\right)^{zdraw} = \left(\frac{C_{draw}^{recovery}}{C_{draw}^{waste}}\right)^{zP(V)} \tag{Eq. 4}$$

If $HPO_4^{2-}$ is being exchanged with $Cl^-$ (or any other monovalent ion), then Eq. 5 describes the corresponding equilibrium ratios in the recovery and waste compartments.

$$\frac{[HPO_4^{2-}]^{recovery}}{[HPO_4^{2-}]^{waste}} = \left(\frac{[Cl^-]^{recovery}}{[Cl^-]^{waste}}\right)^2 \tag{Eq. 5}$$

Therefore, by maintaining a molar ratio of $[Cl^-]^{recovery}$ to $[Cl^-]^{waste}$ of 10, the concentration of $HPO_4^{2-}$ in the recovery side of the reactor should be approximately 100× that in the waste chamber. In practice, this means that 99% of phosphorus can be recovered into a "clean" solution. Since solids and cations cannot cross the anion exchange membrane, the recovery solution contains phosphorus, the draw ion ($Cl^-$ in this example), and the co-ion added with $Cl^-$ (e.g., $Na^+$, if NaCl was used to generate the draw solution).

Figure 2:
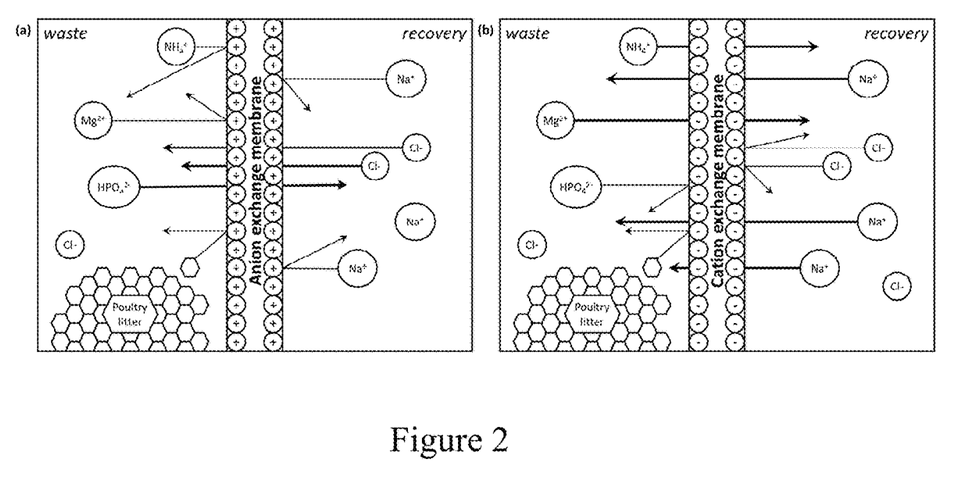
FIG. 2 shows (a) phosphorus and (b) magnesium/ammonium recovery using the Donnan Membrane Principle with anion and cation exchange membranes. Note that solid particles and cations cannot cross the anion exchange membrane and anions cannot cross the cation exchange membrane and electroneutrality is maintained.
Figure 3:
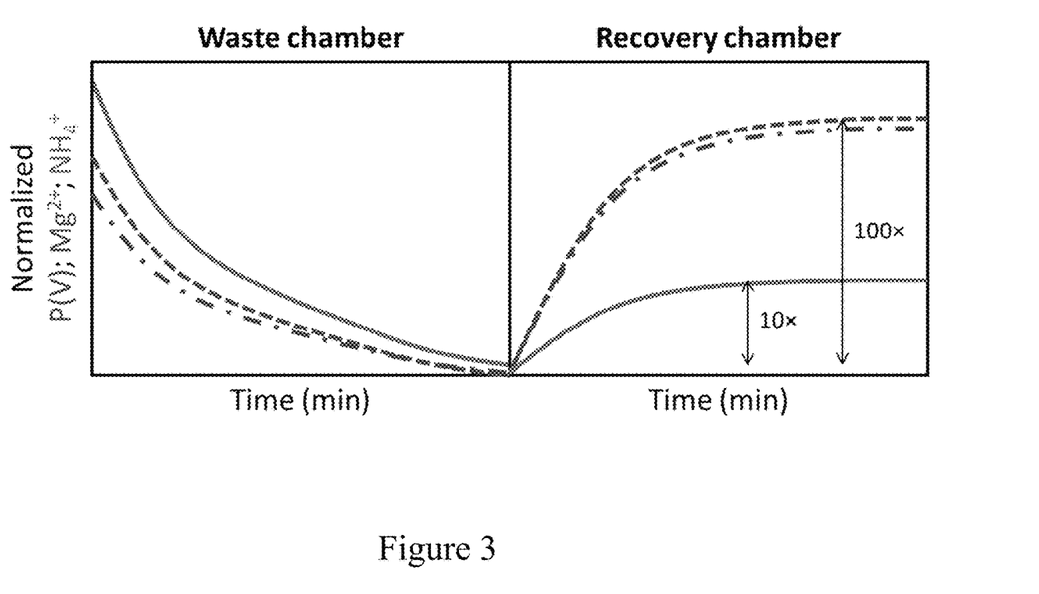
FIG. 3 shows and illustration of the impact of the Donnan Membrane Principle for nutrient recovery.

A similar scheme using a cation exchange membrane can recover $Mg^{2+}$, $Ca^{2+}$, $NH_4^+$, and $K^+$ (FIG. 2b). These cations are important for recovery of struvite, potassium struvite and hydroxyapatite solids. By maintaining a molar ratio of $[Na^+]^{recovery}$ to $[Na^+]^{waste}$ of 10, the $Mg^{2+}$, $Ca^{2+}$, $NH_4^+$, and $K^+$ recovery efficiencies would be 99%, 99%, 90%, and 90%, respectively. Since dissolved $NH_4^+$ and $K^+$ levels are typically greater than P(V) concentrations, the lower recovery of these species does not affect our ability to precipitate struvite-like minerals. The concentration effect observed during the Donnan Membrane Principle is illustrated in FIG. 3. These two streams, namely the P(V) and Mg—$NH_4$—K rich solutions, can be mixed at the proper ratio to produce struvite or potassium struvite. The mixing ratio will be dependent on the total phosphorus concentration in the recovery solution from FIG. 2a and the magnesium and ammonium/potassium concentrations in the recovery solution from FIG. 2b. The dissolution reactions (Rxns. 1-2) and equilibrium constants (Eq. 7-8) for struvite and potassium struvite are shown below, respectively.

$$MgNH_4PO_4 \cdot 6H_2O(s) \rightleftharpoons Mg^{2+} + NH_4^+ + PO_4^{3-} + 6H_2O \tag{Rxn. 1}$$

$$K_{sp,NH_4MgPO_4 \cdot 6H_2O} = 10^{-18.8} = [NH_4^+][Mg^{2+}][PO_4^{2-}] \tag{Eq. 6}$$

$$MgKPO_4 \cdot 6H_2O(s) \rightleftharpoons Mg^{2+} + K^+ + PO_4^{3-} + 6H_2O \tag{Rxn. 2}$$

$$K_{sp,KMgPO_4 \cdot 6H_2O} = 10^{-10.6} = [K^+][Mg^{2+}][PO_4^{8-}] \tag{Eq. 7}$$

The nutrient extraction technology of the present invention can be developed into a suite of commercial products aimed at providing on-site nutrient recovery. These products include chamber-, tubular-, and envelope-type systems. The chamber- and tubular-nutrient extraction devices of the present invention are expected to be most relevant to on site nutrient recovery from animal manure pits and lagoons. These devices can be easily assembled into a manifold that can be lowered into pits/lagoons and lifted for cleaning purposes. Operational units will involve a continuous flow of draw solution to allow collection of precipitated fertilizer products. In that case, nutrient extraction systems will contain a separate gravimetric separation that allows collection of solids and recirculation of bulk draw solutions.

The chamber-type devices can be constructed of PVC piping. Cation (CM1-7000) and anion (AMI-7001) exchange membranes from Membranes International Inc. (Ringwood, N.J.) may be employed. Salient properties of the ion exchange membranes are provided in Table 1.

TABLE 1

| Salient information for the ion exchange membranes | | |
|---|---|---|
| Parameter | CMI-7000 | AMI-7001 |
| Functionality | Strong Acid | Strong base |
| Polymer structure | Gel polystyrene | Gel polystyrene |
| Cross-linking | Divinylbenzene | Divinylbenzene |
| Functional group | Sulfonic acid | Quaternary ammonium |
| Parent form | Sodium | Chloride |
| Thickness (mm) | 0.45 ± 0.25 | 0.45 ± 0.25 |
| Capacity (meq/g) | 1.6 ± 0.1 | 1.3 ± 0.1 |
| Water permeability (mL/hr-ft² at 5 psi) | <3 | <3 |
| Chemical stability range (pH) | 1-10 | 1-10 |

Figure 4:
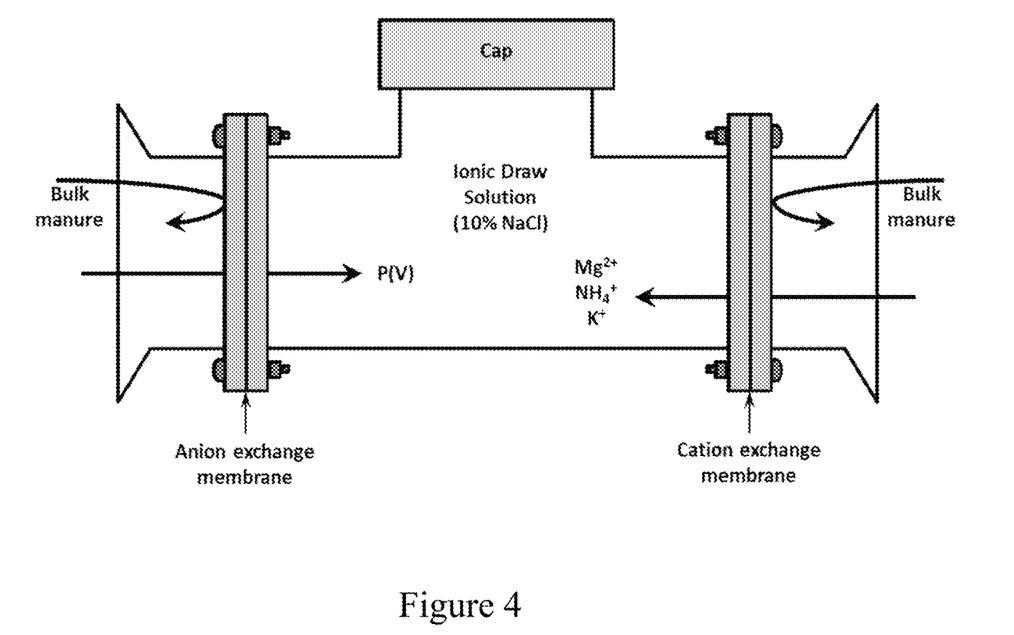
FIG. 4 shows a schematic representation of a chamber-type nutrient extraction and recovery device (NERD) wherein the recovery compartment is included in a waste compartment (not shown).
Figure 5:
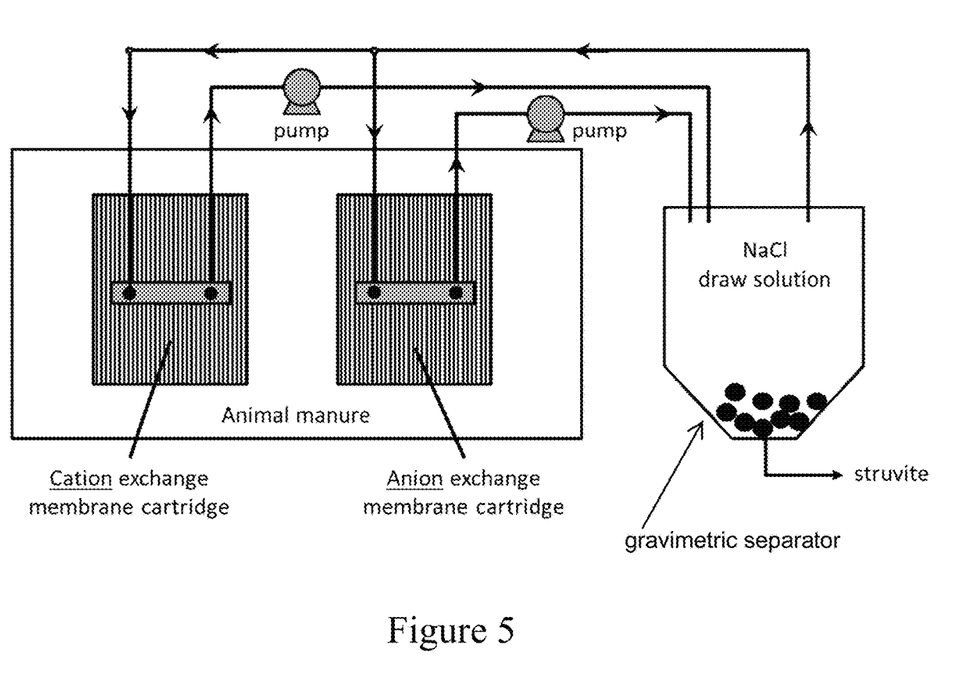
FIG. 5 shows an alternative system for recovery of nutrients from waste material.

A generalized schematic of the chamber-type passive sampling devices is provided in FIG. 4. The main section of the proposed device is a three-way-tee piece of PVC piping; this piping has one outlet on the z-axis and two outlets along the x-axis. The outlet on the z-axis is fitted with a male adaptor to allow for capping; therefore, this outlet represents the filling/emptying port for the device. The cap is fitted with a rubber septum to allow for easy sampling. The two side outlets (along the x-axis) are fitted with PVC flanges; corresponding pieces of PVC pipe are also fitted with PVC flanges. Cross-sections of cation and anion exchange membranes are fitted between these pieces as indicated in FIG. 4. Flanges may be secured using stainless steel screws, washers, and nuts.

Figure 6:
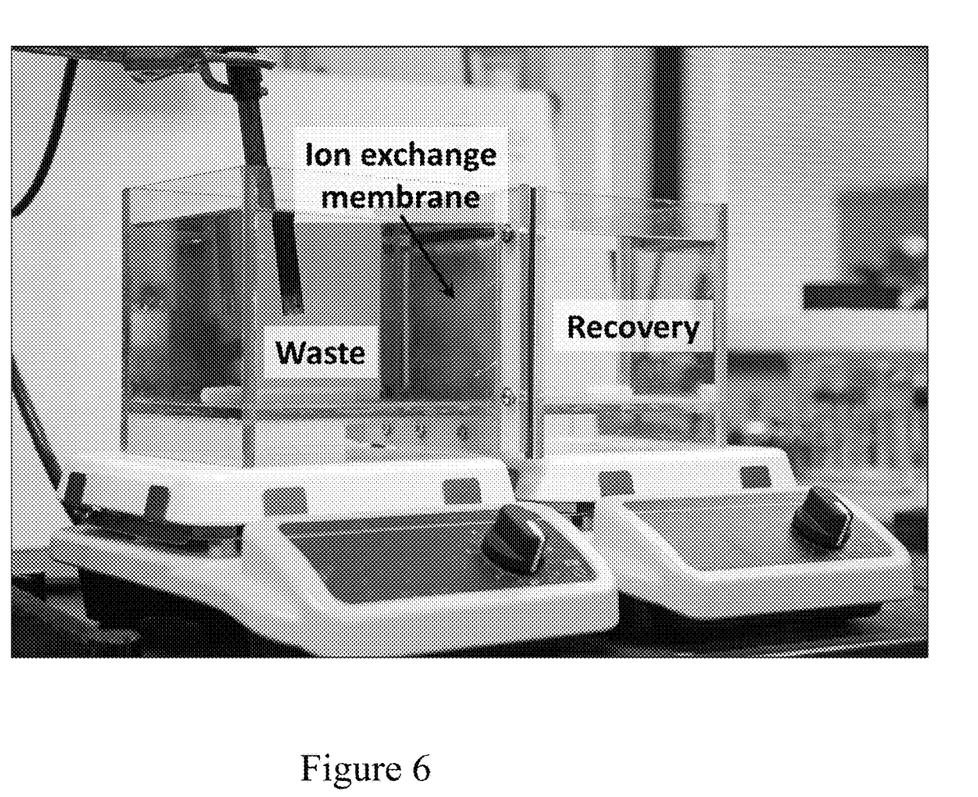
FIG. 6 is a photograph of laboratory-scale DMP-based NERD reactor containing (left) poultry litter extract and (right) NaCl draw solution.

A prototype reactor with 2-L waste and recovery chambers separated by an anion exchange membrane (FIG. 6). For all preliminary experimentation, a AMI-7001 (Membranes International) was used which is a strong base anion exchange membrane consisting of a gel polystyrene polymer cross-linked with divinylbenzene and quaternary ammonium functional groups (total exchange capacity=1.3 meq/g). Preliminary experimentation was conducted for P(V) recovery from synthetic wastewater, wastewater effluent, and animal manure. The reactor body was constructed using clear polycarbonate, silicon frames (to prevent water leakage around the membrane), and stainless steel screws, washers, and nuts. The reactor chambers were continuously mixed using magnetic stirrers.

Optimization of Nutrient Recovery Efficiency and Kinetics

Figure 7:
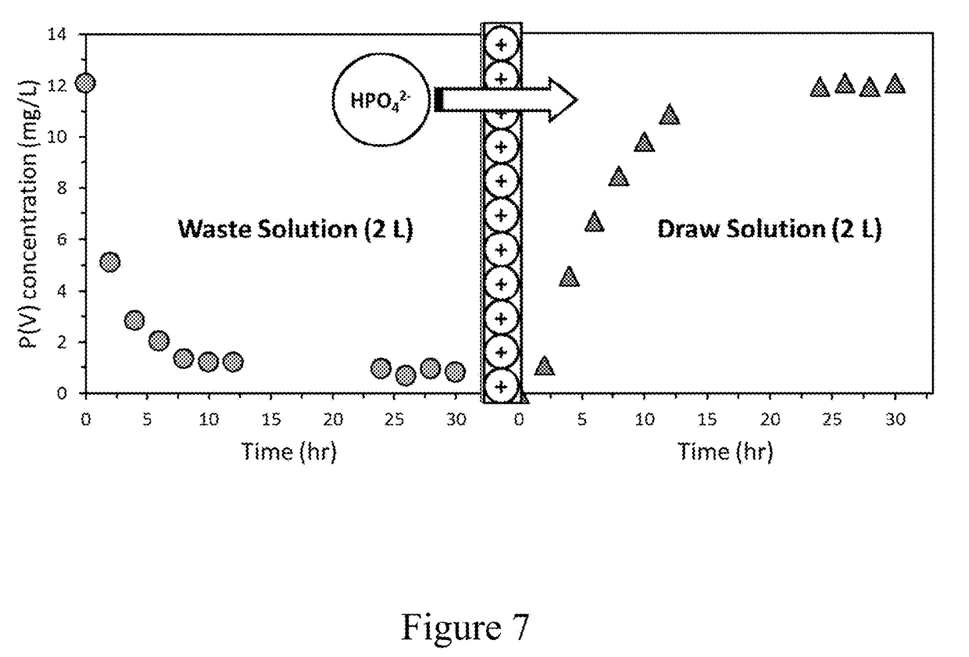
FIG. 7 shows the recovery of >99% phosphorus from a synthetic wastewater using a NaCl draw solution.

Results from an experiment with synthetic wastewater are shown in FIG. 7. The synthetic wastewater was comprised of 100 mg/L of $Na_2HPO_4$ (pH, 9.8; conductivity, 113 µS/cm), while the draw solution contained 10 g/L NaCl (pH, 6.22; conductivity, 18.1 mS/cm). Phosphorus in the waste compartment rapidly exchanged with chloride from the recovery compartment in the first eight hours of operation. After 24 hours, almost all of the phosphorus was recovered. For this scenario, the maximal chloride transfer is equivalent to two times the initial $HPO_4^{2-}$ concentration. The corresponding chloride ratio in the waste/recovery chambers will be as high as 120 mol/mol. Then, the P(V) recovery will be as high as 99.99%.

Figure 8:
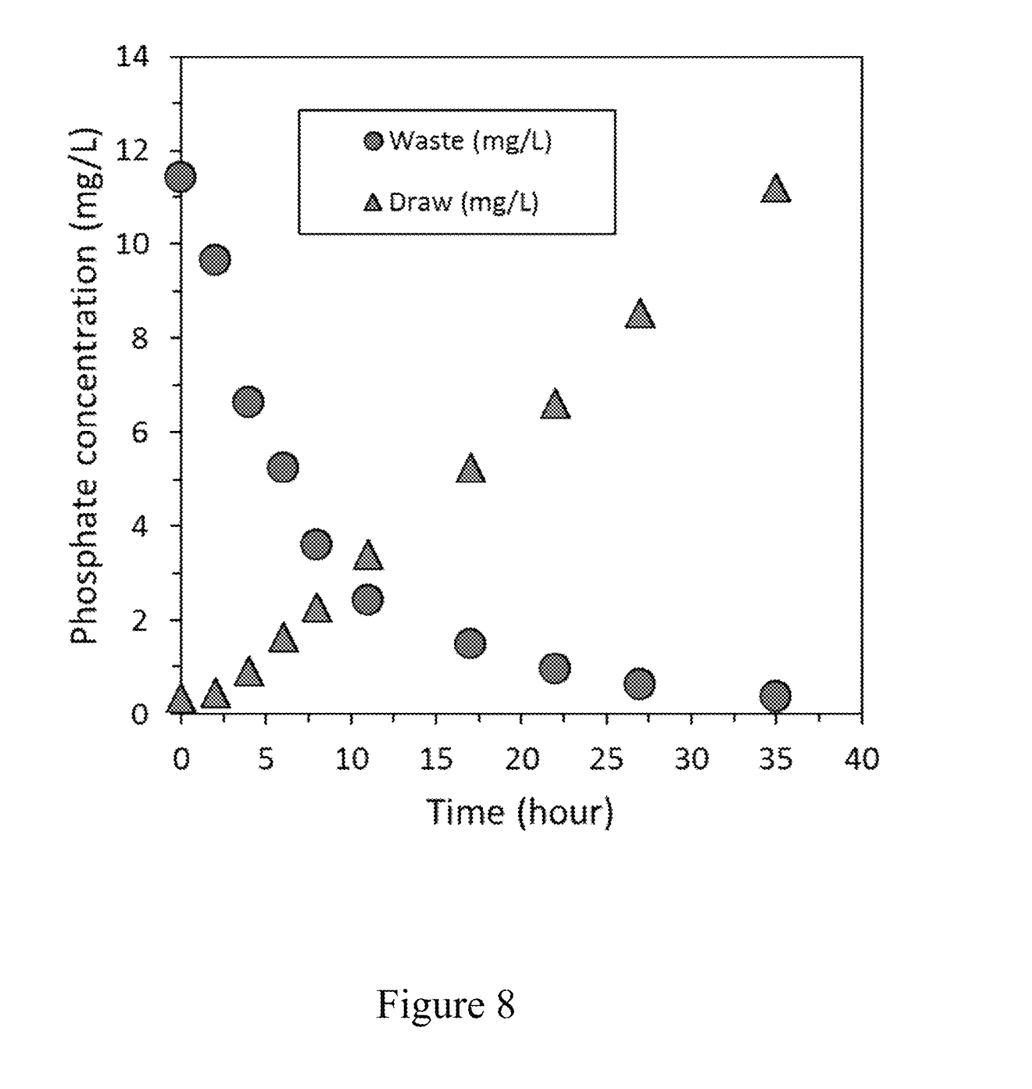
FIG. 8 shows the recovery of >99% phosphorus from synthetic wastewater using an NaOH-based draw solution.

A similar experiment was run using a synthetic wastewater containing of 100 mg/L of $Na_2HPO_4$ (pH, 9.8; conductivity, 113 µS/cm), while the draw solution contained 100 mM NaOH (pH, 12.7; conductivity, 22.7 mS/cm). The P(V) recovery was >99%, as indicated in FIG. 8.

Selective Recovery of Struvite-Based Minerals

Figure 9:
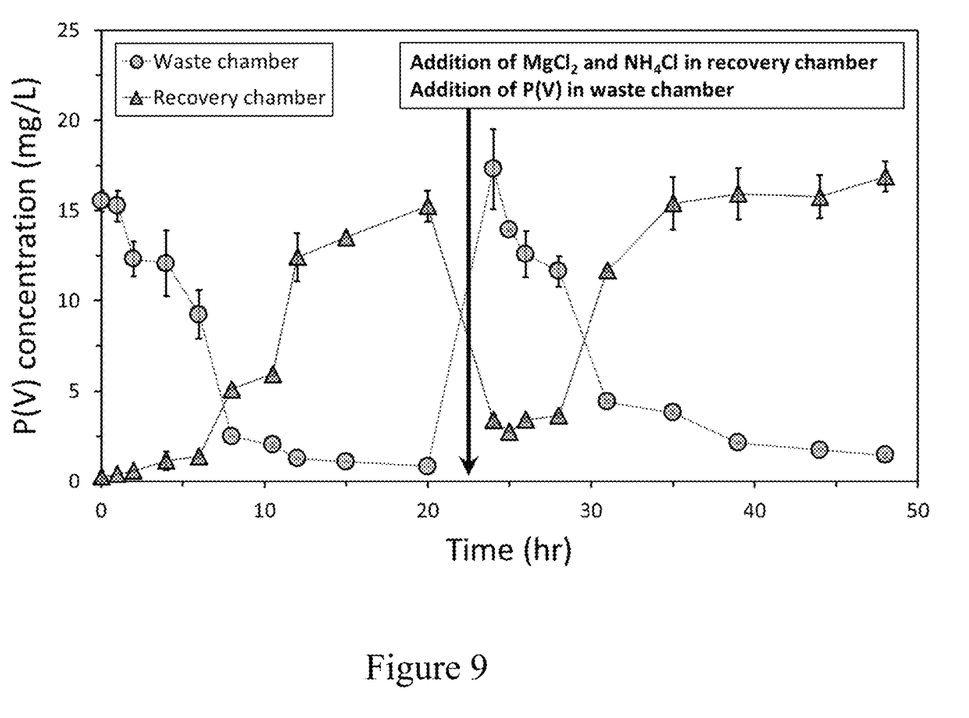
FIG. 9 shows data demonstrating the use of a regular precipitation scheme to maintain the electrochemical potential gradient for long-term phosphorus recovery.

Using the reactor in FIG. 6, experiments were conducted to investigate the selective and continuous recovery of struvite minerals. FIG. 9 shows data from an experiment with a 100 mg/L $Na_3PO_4$ synthetic wastewater (pH, 10.4; conductivity, 135 µS/cm) with a 10 g/L NaCl draw solution (pH, 6.2; conductivity, 18.1 mS/cm). Over the first 24 hours of operation, P(V) was effectively recovered in the draw solution. At 24 hours, we dosed another 100 mg/L of $Na_3PO_4$ into the waste chamber and simultaneously added $MgCl_2$ and $NH_4Cl$ into the recovery chamber in equimolar fashion to the recovered P(V). These treatments caused the P(V) concentration to increase in the waste compartment and decrease in the recovery chamber due to struvite precipitation. In combination, these changes also re-established the electrochemical potential gradient across the anion exchange membrane, resulting in continued recovery from 24 to 48 hours. At 48 hours, over 95% P(V) recovery was achieved.

Figure 10:
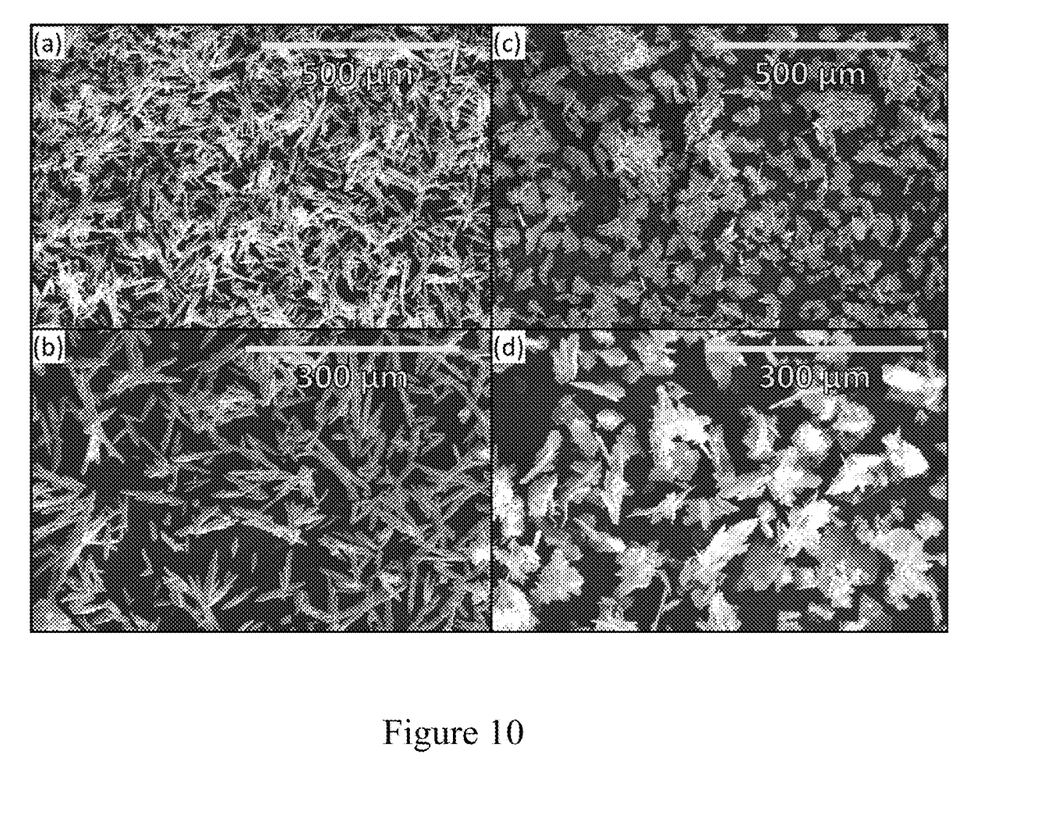
FIG. 10 shows SEM microphotographs of (a-b) struvite and (c-d) potassium struvite recovered from NERD reactors treating synthetic wastewater.

P(V) was recovered using draw solutions containing $MgCl_2$ and $NH_4Cl$ or KCl. Because the $Mg^{2+}$ and $NH_4^+$ or $K^+$ were present in the recovery compartment in excess of P(V), the recovered phosphorus was driven towards precipitation as struvite or potassium struvite. Scanning electron microscopy (SEM) microphotographs of the recovered solids are shown in FIG. 10. The particles in FIG. 10 (*a-b*) were recovered using a draw solution with $MgCl_2/NH_4Cl$, whereas the images in FIG. 10 (*c-d*) stem from an experiment with a $MgCl_2/KCl$ draw solution. Note that energy-dispersive X-ray spectroscopy (EDS) analyses confirmed mineral composition. From the SEM images, the morphological differences between struvite and potassium struvite are clear, with "needle-like" struvite crystals and "flake-like" potassium struvite precipitates.

Nutrient Recovery from Wastewater, Activated Sludge, & Animal Manure

Figure 11:
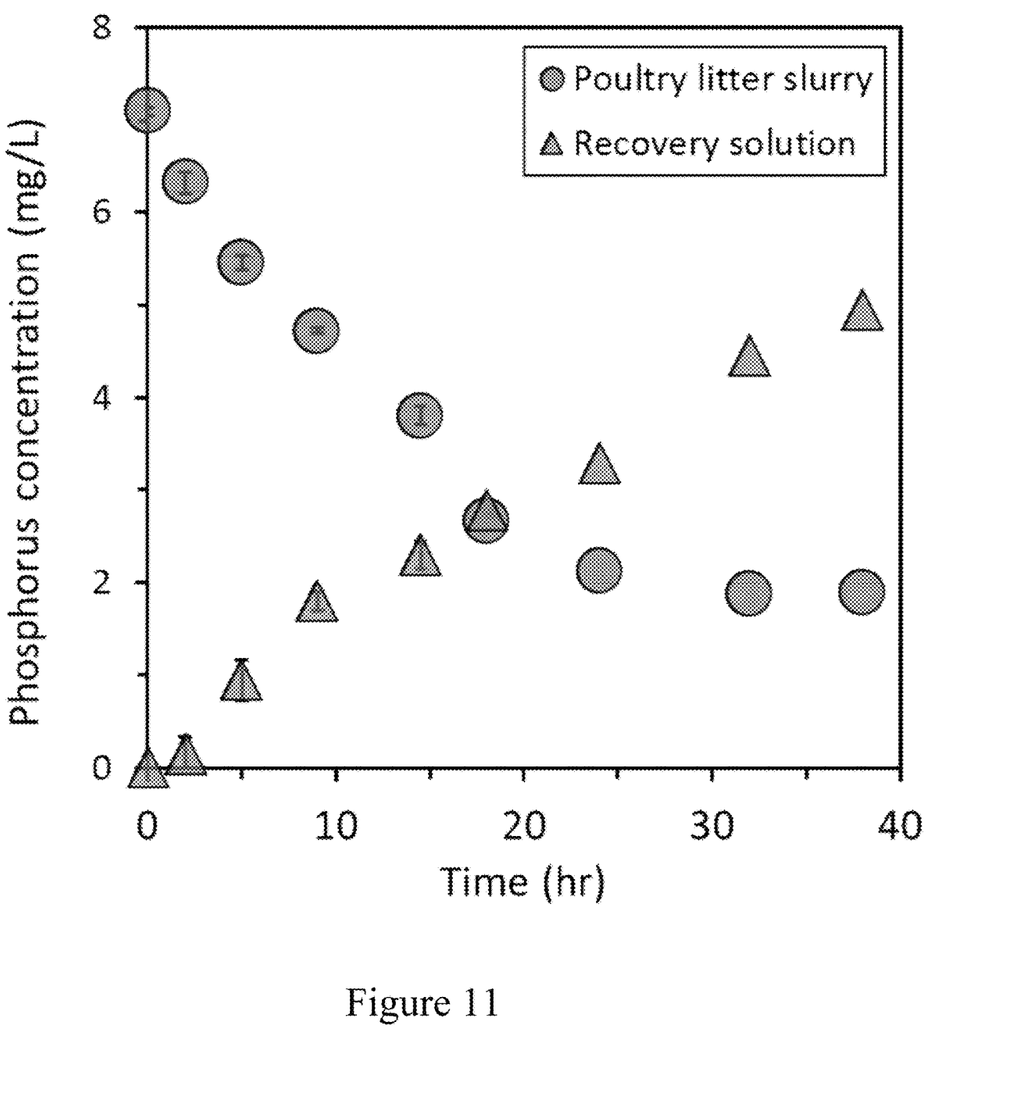
FIG. 11 shows recovery of P(V) from a slurry containing 1 g/L of poultry litter using a draw solution of 10 g/L NaCl.

A study was conducted to recover phosphorus from a poultry litter slurry (FIG. 11). After 38 hours, over 70% of the P(V) was recovered. While the rate of recovery was slower than the synthetic solutions described above, the extent of recovery indicates that the overall recovery potential is still high. Furthermore, the AMI-7001 membranes that were used in this experiment were relatively thick, 450±25 µm. Notably the thickness of the ion exchange membranes may be thinner (i.e., 200 µm or less), and should provide faster recovery rates in real wastewaters.

REFERENCES

The contents of all references cited herein are incorporated by reference herein for all purposes.
1. Sarkar, S., SenGupta, A. K., Prakash, P. (2010). The Donnan Membrane Principle: Opportunities for Sustainable Engineered Processes and Materials. *Environmental Science & Technology* 44(4), 1161-1166.
2. Prakash, P., SenGupta, A. K. (2005). Modeling Al3+/H+ ion transport in Donnan membrane process for coagulant recovery. *AIChE Journal* 51(1), 333-344.
3. Prakash, P., Hoskins, D., SenGupta, A. K. (2004). Application of homogeneous and heterogeneous cation-exchange membranes in coagulant recovery from water treatment plant residuals using Dorman membrane process. *Journal of Membrane Science* 237(12), 131-144.
4. Prakash, P., SenGupta, A. K. (2003). Selective Coagulant Recovery from Water Treatment Plant Residuals Using Dorman Membrane Process. *Environmental Science & Technology* 37(19), 4468-4474.
5. O'Neal, J. A., Boyer, T. H. (2013). Phosphate recovery using hybrid anion exchange: Applications to source-separated urine and combined wastewater streams. *Water Research* 47(14), 5003-5017.
6. Sendrowski, A., Boyer, T. H. (2013). Phosphate removal from urine using hybrid anion exchange resin. *Desalination* 322, 104-112.
7. Karunanithi, R., Szogi, A. A., Bolan, N., Naidu, R., Loganathan, P., Hunt, P. G., Vanotti, M. B., Saint, C. P., Ok, Y. S., Krishnamoorthy, S. (2015). Phosphorus recovery and reuse from waste streams. *Adv. Agron* 131.
8. Sengupta, S., Nawaz, T., Beaudry, J. (2015). Nitrogen and Phosphorus Recovery from Wastewater. *Current Pollution Reports*, 1-12.

That which is claimed is:

1. A system for processing a source of waste to produce at least one target product selected from the group consisting of struvite, potassium struvite, hydroxyapatite, and any combination thereof, the system comprising:
a chamber-type device comprising at least one wall, a cation exchange membrane having a first side and a second side, and an anion exchange membrane having a first side and a second side, wherein the at least one wall, the first surface of the cation exchange membrane and the first surface of the anion exchange membrane define an interior of a recovery compartment for containing a recovery or draw solution, wherein the chamber-type device is communicatively connected to a gravimetric separator that permits collection of the at least one target product from the device, and recirculation of, the recovery or draw solution to the device, wherein, following insertion of the chamber-type device into the source of waste, the second surface of the cation exchange membrane and the second surface of the anion exchange membrane are in contact with the source of waste, wherein the recovery or draw solution comprises at least one cation and at least one anion, wherein the at least one cation is selected from the group consisting of $Na^+$, $K^+$, $Mg^{2+}$, $Ca^{2+}$, $NH_4^+$ and combinations thereof, and the at least one anion is selected from the group consisting of $HPO_4^{2-}$, $PO_4^{3-}$, $Cl^-$, $HO^-$, $HCO_3^-$, and $HCOO^-$ and combinations thereof, and wherein the at least one cation and at least one anion in the recovery or draw solution precipitate to form the at least one target product, and wherein the system does not require an electric current supply to produce the at least one target product.

2. The system of claim 1, wherein the system does not require a pressure gradient to produce the at least one target product.

3. The system of claim 1, wherein the waste source comprises at least one of manure, wastewater, waste activated sludge, and agricultural waste.

4. The system of claim 1, wherein the chamber-type device further comprises at least one outlet for accessing the compartment.

5. The system of claim 1, wherein the cation exchange membrane comprises a polymer containing anionic groups including sulfonic and/or carboxylic groups.

6. The system of claim 1, wherein the anion exchange membrane comprises a polymer containing quaternary or tertiary amine groups.

7. The system of claim 1, wherein the recovery or draw solution has a pH ranging from about 7 to 11.

8. The system of claim 1, wherein the chamber-type device is assembled into a manifold.

9. The system of claim 1, wherein the recovery or draw solution comprises sodium chloride.

10. A method of processing a source of waste to produce at least one target product selected from the group consisting of struvite, potassium struvite, hydroxyapatite, and any combination thereof, said method comprising introducing the system of claim 1 into a waste source, wherein the at least one cation and at least one anion in the recovery or draw solution precipitate to form the at least one target product, and collecting the at least one target product in the gravimetric separator.

11. The method of claim 10, wherein the waste source comprises at least one of manure, wastewater, waste activated sludge, and agricultural waste.

* * * * *